(12) United States Patent
Poeltl et al.

(10) Patent No.: US 8,431,058 B2
(45) Date of Patent: Apr. 30, 2013

(54) POLYURETHANE SYSTEMS FOR PRODUCTION OF POLYURETHANE SANDWICH COMPONENTS

(75) Inventors: Joerg Poeltl, Lemfoerde (DE); Klaus Schuerer, Markt Indersdorf (DE); Michael Fader, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 711 days.

(21) Appl. No.: 12/531,082

(22) PCT Filed: Mar. 14, 2008

(86) PCT No.: PCT/EP2008/053061
§ 371 (c)(1),
(2), (4) Date: Sep. 14, 2009

(87) PCT Pub. No.: WO2008/113751
PCT Pub. Date: Sep. 25, 2008

(65) Prior Publication Data
US 2010/0136285 A1 Jun. 3, 2010

(30) Foreign Application Priority Data
Mar. 19, 2007 (EP) .................... 07104380

(51) Int. Cl.
*B28B 5/00* (2006.01)
*B32B 27/40* (2006.01)
*C08G 18/16* (2006.01)

(52) U.S. Cl.
USPC ........ 264/241; 264/232; 428/423.1; 428/116; 524/589

(58) Field of Classification Search .............. 428/116, 428/423.1; 524/589; 264/232, 241
See application file for complete search history.

(56) References Cited

U.S. PATENT DOCUMENTS

| | | | |
|---|---|---|---|
| 4,336,298 A | 6/1982 | Schwarz | |
| 4,448,939 A * | 5/1984 | Fasolka et al. | 525/474 |
| 4,616,043 A | 10/1986 | Smith | |
| 4,764,537 A | 8/1988 | Horn et al. | |
| 5,002,806 A | 3/1991 | Chung | |
| 5,204,307 A * | 4/1993 | Ihrman et al. | 502/155 |
| 5,389,430 A * | 2/1995 | Yilgor et al. | 442/76 |
| 5,856,371 A | 1/1999 | Grimm et al. | |
| 6,294,248 B1 * | 9/2001 | Madan et al. | 428/318.6 |
| 7,972,676 B2 * | 7/2011 | Kleba et al. | 428/116 |
| 2002/0160204 A1 * | 10/2002 | Partusch et al. | 428/423.1 |
| 2004/0197472 A1 | 10/2004 | Scofield et al. | |
| 2009/0326148 A1 * | 12/2009 | Schmalkuche et al. | 524/789 |

FOREIGN PATENT DOCUMENTS

| | | |
|---|---|---|
| DE | 36 07 447 | 9/1987 |
| DE | 10 2004 030 196 | 1/2006 |
| EP | 0 068 209 | 1/1983 |
| EP | 0 153 639 | 9/1985 |
| EP | 0 250 351 | 12/1987 |
| EP | 0 728 574 | 8/1996 |
| WO | 86 06387 | 11/1986 |
| WO | WO 2006099939 A1 * | 9/2006 |

* cited by examiner

Primary Examiner — Thao T. Tran
(74) Attorney, Agent, or Firm — Oblon, Spivak, McClelland, Maier & Neustadt, L.L.P.

(57) ABSTRACT

The present invention relates to the use of a polyurethane system, comprising (a) polyisocyanates, (b) at least one compound reactive with isocyanate, (c) at least one reactive chain extender having at least two groups reactive toward isocyanates, where at least one group reactive toward isocyanates is a free, primary $NH_2$ group, (d) at least one catalyst, and (e) if appropriate, further additives, for production of polyurethane sandwich components. The present invention further relates to a process for production of polyurethane sandwich components, and to polyurethane sandwich components obtainable by this process.

20 Claims, No Drawings

POLYURETHANE SYSTEMS FOR PRODUCTION OF POLYURETHANE SANDWICH COMPONENTS

CROSS REFERENCE TO RELATED APPLICATIONS

The present application is the national stage of international application PCT/EP2008/053061, filed on Mar. 14, 2008, and claims the benefit of the filing date of European Application No. 07104380.6, filed on Mar. 19, 2007.

The present invention relates to the use of a polyurethane system for production of polyurethane sandwich components, comprising (a) polyisocyanates, (b) at least one compound reactive with isocyanate, (c) at least one reactive chain extender having at least two groups reactive toward isocyanates, where at least one group reactive toward isocyanates is a free, primary $NH_2$ group, (d) at least one catalyst, and (e) if appropriate, further additives. The present invention further relates to a process for production of polyurethane sandwich components, and to polyurethane sandwich components obtainable by this process.

Further embodiments of the present invention are found in the claims, in the description, and in the examples. Of course, the abovementioned features, and the features that will be explained below, of the inventive subject matter can be used not only in the respective combination stated but also in other combinations, without exceeding the scope of the invention.

Polyurethane sandwich components have been known for a long time. These are produced by covering a core layer with a reinforcing layer. A polyurethane reaction mixture is applied to one side of this "sandwich precursor", and also often to two sides, preferably by spray-application. The component covered with the polyurethane reaction mixture, the unfinished sandwich component, is then placed in a mold, in which the polyurethane reaction mixture is hardened to give the polyurethane. The polyurethane sandwich component thus obtained is then demolded.

The process in the mold often comprises not only hardening of the polyurethane reaction mixture but also three-dimensional shaping of the polyurethane sandwich component, for example via compression of the core layer. A requirement here is that the polyurethane reaction mixture does not harden before it reaches the mold, since otherwise three-dimensional shaping is impossible. Particularly in the region of the margins of these compressed regions, the core layer can only be sealed by polyurethane if polyurethane reaction mixture of sufficient flowability remains present after the compression process to cover these regions.

A problem with the known process is that the polyurethane reaction mixture has a tendency to run or drip prior to introduction of the unfinished sandwich component into the mold. In the mold, particularly in regions in which the core layer is compressed, excessive run again leads to formation of poorly defined edges.

To prevent dripping and excessive run and nevertheless to ensure sufficient loading of the "sandwich precursor" with polyurethane reaction mixture, the polyurethane reaction mixture is loaded with an industrial gas, such as air or carbon dioxide, prior to application to the core layer. After application of a gas-loaded reaction mixture, the gas expands, thus preventing run and dripping. DE 10 2004 030 196 describes this type of process by way of example.

However, a process in which a polyurethane reaction mixture is loaded with a gas incurs high apparatus cost. For example, gas cylinders have to be provided and maintained, and the reaction mixture or its starting materials have to be loaded with gas in a separate step of a process. Furthermore, for some applications it is advantageous that the polyurethane has not been foamed in the polyurethane sandwich component.

It was therefore an object of the present invention to provide a polyurethane system which is intended for production of polyurethane sandwich components and which permits production of polyurethane sandwich components with lower technical cost, while nevertheless preventing or inhibiting dripping and excessive run of the reaction mixture. Another object was to provide a polyurethane system which has a long open time after preparation of the reaction mixture, in order to cover the margins of the compressed regions in the shaping process.

This object is achieved via the use of a polyurethane system, comprising (a) polyisocyanates, (b) at least one compound reactive with isocyanate, (c) at least one reactive chain extender having at least two groups reactive toward isocyanates, where at least one group reactive toward isocyanates is a free, primary $NH_2$ group, (d) at least one catalyst, and (e) if appropriate, further additives for production of polyurethane sandwich components.

For the purposes of the invention, a polyurethane system here is a system composed of at least two components, whereupon on mixing of the components the inventive polyurethane reaction mixture is obtained. Components (b) to (e) are often combined here to give what is known as a polyol component, and component (a) is termed the isocyanate component.

Polyisocyanates used are preferably aromatic isocyanates. Aromatic isocyanates of the general formula $R(NCO)_z$ are preferably used, where R is a polyvalent organic radical which has an aromatic system, and z is a whole number which is at least 2. Examples of these are 4,4'-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, toluene 2,4-diisocyanate, toluene 2,6-diisocyanate, mixtures composed of toluene 2,4- and 2,6-diisocyanate, naphthalene 1,5-diisocyanate, 1-methoxyphenylene 2,4-diisocyanate, diphenylmethane 4,4'-diisocyanate, diphenylmethane 2,4'-diisocyanate, biphenylene 4,4'-diisocyanate, 3,3'-dimethyldiphenylmethane 4,4'-diisocyanate and 3,3'-dimethyldiphenylmethane 4,4'-diisocyanate; triisocyanates, such as triphenylmethane 4,4',4''-triisocyanate and toluene 2,4,6-triisocyanate, and tetraisocyanates, such as 4,4'-dimethyldiphenylmethane 2,2',5,5'-tetraisocyanate. Particular preference is given to toluene diisocyanates, diphenylmethane 2,4'-diisocyanate, diphenylmethane 4,4'-diisocyanate, polymethylene polyphenylene polyisocyanate, and derivatives and mixtures thereof.

It is preferable to use isocyanates having a relatively large number of rings, and it is particularly preferable to use polymethylene polyphenylene polyisocyanate, also termed polymer MDI. These can also, prior to use, be prepolymerized with polyetherols or polyesterols to give isocyanate prepolymers, in order to establish specific properties. It is also possible to use crude MDI.

A particular modified, polyvalent isocyanate used comprises reaction products of polymer MDI and of polyesterols, as described under (b). The isocyanate component here has functionalities of 1.2 to 3.0, preferably from 1.5 to 3.0, particularly preferably from 2.0 to 2.8.

The compound (b) reactive with isocyanate can comprise any compound that can be used in polyurethane preparation having at least two hydrogen atoms reactive toward isocyanates. The compound (b) which is reactive with isocyanate preferably comprises a polyether polyol, a polyester polyol, an amine-functionalized compound, or a mixture thereof. Particular preference is given to polyether polyols.

Suitable polyether polyols can be prepared by known processes, for example via anionic polymerization with alkali metal hydroxides, such as sodium hydroxide or potassium hydroxide, or with alkali metal alcoholates, such as sodium methoxide, or sodium ethoxide or potassium ethoxide, or potassium isopropoxide, as catalysts, and with addition of at least one starter molecule, which comprises from 2 to 8 reactive hydrogen atoms, or via cationic polymerization with Lewis acids, such as antimony pentachloride and boron fluoride etherate, or bleaching earth, as catalysts, starting from one or more alkylene oxides having from 2 to 4 carbon atoms in the alkylene radical. Other catalysts that can be used are multimetal cyanide compounds, known as DMC catalysts.

Examples of suitable alkylene oxides are tetrahydrofuran, propylene 1,3-oxide, butylene 1,2- or 2,3-oxide, styrene oxide, and preferably ethylene oxide and propylene 1,2-oxide. The alkylene oxides can be used individually, in alternating succession, or in the form of a mixture.

Examples of starter molecules that can be used are: water, organic dicarboxylic acids, such as succinic acid, adipic acid, phthalic acid, and terephthalic acid, aliphatic and aromatic, optionally N-mono- or N,N- or N,N'-dialkyl-substituted diamines having from 1 to 4 carbon atoms in the alkyl radical, e.g. optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5-, or 1,6-hexamethylenediamine, phenylenediamines, 2,3-, 2,4-, and 2,6-tolylenediamine, and 4,4'-, 2,4'- and 2,2'-diaminodiphenylmethane.

Other starter molecules that can be used are: alkanolamines, such as ethanolamine, diethanolamine, N-methyl- and N-ethylethanolamine, N-methyl- and N-ethyldiethanolamine, and triethanolamine, and ammonia. It is preferable to use polyhydric, in particular dihydric to octahydric, alcohols, such as ethanediol, 1,2- and 1,3-propanediol, diethylene glycol, dipropylene glycol, 1,4-butanediol, 1,6-hexanediol, glycerol, trimethylolpropane, pentaerythritol, glucose, fructose, and sucrose.

The polyether polyols, preferably polyoxyethylene polyols, polyoxypropylene polyols, and polyoxypropylene-polyoxyethylene polyols, have average functionality of from 1.5 to 5.0, preferably from 1.8 to 4.2, and in particular from 2.0 to 3.5, and have number-average molecular weights which are preferably from 32 to 1500, particularly preferably from 60 to 1000, and in particular from 60 to 800.

The different functionalities here are preferably obtained via the use of different starters.

Other suitable polyols are polymer-modified polyols, preferably polymer-modified polyesterols or polyetherols, particularly preferably graft polyetherols. These are "polymer polyol", whose usual content of, preferably thermoplastic, polymers is from 5 to 50% by weight, preferably from 10 to 45% by weight, particularly preferably from 15 to 25% by weight, and in particular from 18 to 22% by weight. These polymer polyesterols are described by way of example in EP-A-250 351 and are usually prepared via free-radical polymerization of suitable olefinic monomers, such as styrene, acrylonitrile, acrylates, and/or acrylamide, in a polyesterol serving as graft base. The side chains are generally produced via transfer of the free radicals from growing polymer chains to polyesterols or polyetherols. The polymer polyol comprises not only the graft copolymers but predominantly the homopolymers of the olefins, dispersed in unaltered polyesterol.

In one preferred embodiment, the monomers used comprise acrylonitrile and styrene, and in particular exclusively styrene. The monomers are, if appropriate, polymerized in the presence of further monomers, of a macromer, and of a moderator, and with use of a free-radical initiator, mostly azo compounds or peroxide compounds, in a polyesterol as continuous phase.

During the free-radical polymerization reaction, the macromers are incorporated concomitantly into the copolymer chain. This forms block copolymers having a polyester block and a polyacrylonitrile-styrene block, which act as compatibilizer at the interface of continuous phase and dispersed phase, and suppress agglomeration of the polymer polyesterol particles. The proportion of the macromers is usually from 1 to 15% by weight, based on the total weight of the monomers used for preparation of the polymer polyol.

The proportion of polymer polyol is preferably greater than 5% by weight, based on the total weight of component (b). The amount present of the polymer polyols can by way of example be from 30 to 90% by weight, preferably from 55 to 80% by weight, based on the total weight of component (b). The polymer polyol is particularly preferably polyetherol or polymer polyesterol.

The reactive chain extenders (c) used comprise substances which have two groups reactive toward isocyanates, and the substances here have at least one free primary $NH_2$ group. These substances accelerate the polyurethane reaction. The further group reactive toward isocyanate can by way of example have been selected from a primary amino group, an alcohol group, or a thiol group. The reactive chain extenders (c) used can by way of example comprise aliphatic or aromatic amines. The reactive chain extenders (c) here can be used individually or in the form of a mixture.

In one particularly preferred embodiment, the reactive chain extenders (c) used preferably comprise aromatic diamines, in particular tolylenediamines or derivatives thereof, such as 3,5-diethyltolylene-2,4-diamine.

In another preferred embodiment, the reactive chain extender (c) is aliphatic and has, between the two groups reactive toward isocyanates, at least two alkylene groups each bearing one or two carbon atoms, each of the alkylene groups being separated by a heteroatom. The two groups reactive toward isocyanates are in particular amino groups. In this preferred embodiment, the molar mass of the reactive chain extender (c) is preferably from 100 to 400 g/mol, particularly preferably from 100 to 200 g/mol, and particularly from 100 to 150 g/mol. If aliphatic reactive chain extenders are used, the reactive chain extender (c) used particularly comprises triethylene glycol diamine.

The proportion of the reactive chain extenders in the polyol component is preferably from 0.1 to 10% by weight, particularly preferably from 0.3 to 8% by weight, more preferably from 0.5 to 5% by weight, and in particular from 1.5 to 4.0% by weight, based on the total weight of components (b) to (e).

Alongside the reactive chain extenders (c), reactive crosslinking agents can, if appropriate, also be used, these having at least one free primary $NH_2$ group, and accelerating the polyurethane reaction, and having functionality greater than 2.

Alongside the inventive reaction chain extenders (c), further conventional chain extenders can also be used. Examples of these are diols, particularly preferably monoethylene glycol and butanediol. For the purposes of the invention, it is very particularly preferable to use a mixture composed of an inventive reactive chain extender and of a chain extender composed of a diol.

Catalysts (d) used can comprise any of the conventional catalysts for polyurethane preparation. These catalysts are described by way of example in "Kunststoffhandbuch [Plastics handbook], volume 7, Polyurethane [Polyurethanes]", Carl Hanser Verlag, 3rd edition 1993, chapter 3.4.1. Examples of compounds used here are organometallic compounds, preferably organotin compounds, such as stannous salts of organic carboxylic acids, e.g. stannous acetate, stannous octoate, stannous ethylhexoate, and stannous laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture. Other possible catalysts are strongly basic amine catalysts. Examples of these are amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethylether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds, such as triethanolamine, tri-isopropanolamine, N-methyl- and N-ethyldiethanolamine, and dimethylethanolamine. The catalysts can be used individually or as a mixture. If appropriate, catalysts (d) used comprise a mixture composed of metal catalysts and of basic amine catalysts.

An example of the concentration at which the catalysts (d) can be used is from 0.001 to 5% by weight, in particular from 0.05 to 2% by weight, in the form of catalyst or catalyst combination, based on the weight of components (b) to (e).

Other additives (e) that can be used comprise blowing agents, additives to provide thixotropic properties, fillers, antioxidants, dyes, pigments, optical brighteners, and stabilizers with respect to heat, light, and/or UV radiation, plasticizers, or surfactants.

Examples that may be mentioned of suitable release agents are: reaction products of fatty acid esters with polyisocyanates, salts composed of fatty acids and of polysiloxanes comprising amino groups, salts composed of saturated or unsaturated (cyclo)aliphatic carboxylic acids having at least 8 carbon atoms and of tertiary amines, and in particular internal release agents, such as carboxylic esters and/or carboxamides, prepared via esterification or amidation of a mixture composed of montanic acid and of at least one aliphatic carboxylic acid having at least 10 carbon atoms, with at least difunctional alkanolamines, polyols, and/or polyamines whose molar masses are from 60 to 400 g/mol, as disclosed by way of example in EP 153 639, mixtures composed of organic amines, metal stearates, and organic mono- and/or dicarboxylic acids or their anhydrides, as disclosed by way of example in DE-A-3 607 447, or a mixture composed of an imino compound, the metal salt of a carboxylic acid, and, if appropriate, a carboxylic acid, as disclosed by way of example in U.S. Pat. No. 4,764,537.

Blowing agents used can comprise any of the blowing agents known for preparation of polyurethanes. These can comprise chemical and/or physical blowing agents. These blowing agents are described by way of example in "Kunststoffhandbuch [Plastics handbook], volume 7, Polyurethane [Polyurethanes]", Carl Hanser Verlag, 3rd edition 1993, chapter 3.4.5. "Chemical blowing agents" here means compounds which form gaseous products via reaction with isocyanate. Examples of these blowing agents are water or carboxylic acids. "Physical blowing agents" here means compounds which have been emulsified or dissolved in the starting materials for polyurethane preparation and which vaporize under the conditions of polyurethane formation. By way of example, these are hydrocarbons, halogenated hydrocarbons, and other compounds, e.g. perfluorinated alkanes, such as perfluorohexane, chlorofluorocarbons, and ethers, esters, ketones, and/or acetals.

The inventive polyurethane systems preferably use water as blowing agent. The proportion of water in polyurethane systems using water as blowing agent is from 0.1 to 2.0% by weight, particularly preferably from 0.2 to 1.5% by weight, in particular from 0.4 to 1.1% by weight, based on the total weight of components (b) to (e).

Examples of antioxidants, and stabilizers with respect to heat, light, and/or UV radiation are stabilizers from the group of the sterically hindered phenols, e.g. Cyanox 1790® from Cytec Industries Inc., HALS stabilizers (hindered amine light stabilizer), triazines, benzophenones, and the benzotriazoles. Examples of pigments and matting agents are titanium dioxide, magnesium stearate, silicone oil, zinc oxide, and barium sulfate. Examples of dyes are acidic dyes and dispersion dyes.

The present invention further provides a process for production of polyurethane sandwich components, by (i) taking a core layer and at least one reinforcing fiber layer, (ii) applying a polyurethane reaction mixture to the reinforcing fiber layer, (iii) placing the component from (ii) in a mold, and hardening the polyurethane reaction mixture in the mold, (iv) removing the molding from the mold and, if appropriate, subjecting it to downstream operations, where the polyurethane reaction mixture is obtainable via mixing of the components of an inventive polyurethane system.

Preferred material used for the core layer here is thermoformable polyurethane foams or honeycomb papers, honeycomb metals, or honeycomb plastics. The reinforcing fiber layers used can preferably comprise glass fiber mats, glass fiber nonwovens, random glass fiber layers, glass fiber wovens, or chopped or ground glass fibers or chopped or ground mineral fibers, natural fiber mats and natural fiber knits, chopped natural fibers and fiber mats, fiber nonwovens, and fiber knits based on polymer fibers, on carbon fibers, or on aramide fibers, or a mixture of these. The reinforcing fiber layer here can be applied to one side of the core layer or else to both sides of the core layer.

Polyurethane reaction mixture obtainable via mixing of components (a) to (e) of an inventive polyurethane system is applied to the "sandwich precursor" thus obtained. This is preferably achieved via spray-application of the polyurethane reaction mixture. The viscosity of the inventive polyurethane reaction mixture at 25° C. is preferably from 280 to 3000 mPas, particularly preferably from 350 to 2000 mPas, directly after mixing, and from about 5-10 seconds after mixing the viscosity rises sharply.

To prepare the polyurethane reaction mixture, the individual components of the inventive polyurethane system are mixed in such a way that the isocyanate index is from 80 to 200, in particular from 90 to 150. For the purposes of the present invention, the "isocyanate index" means the stoichiometric ratio of isocyanate groups to groups reactive with isocyanate, multiplied by 100. "Groups reactive with isocyanate" here mean any of the groups present in the reaction mixture that are reactive with isocyanate, but not the isocyanate group itself.

The unfinished sandwich component is then placed in a mold, and the polyurethane reaction mixture is hardened. The mold temperature here is preferably from 40 to 160° C., with preference from 80-150° C., particularly preferably from 110-140° C.

If appropriate, the "unfinished sandwich" components are laminated with an outer layer or with a decorative layer. This outer layer or decorative layer can be applied on one or both sides of the polyurethane sandwich component. As an alternative, the outer layer or decorative layer can be applied after demolding of the polyurethane sandwich component, in a further operation.

A decorative layer that can be used here is textile materials resistant to polyurethane saturation, compact or foamed plastics foils, or else polyurethane spray skins or polyurethane RIM skins. Outer layers that can also be used are preformed materials suitable for exterior applications, e.g. metal foils or sheet metal, or else compact thermoplastic composites composed of PMMA (polymethyl methacrylate), ASA (acrylate-modified styrene-acrylonitrile terpolymer), PC (polycarbonate), PA (polyamide), PBT (polybutylene terephthalate), and/or PPO (polyphenylene oxide) in painted or colored form, or in a form which has been rendered paintable. Other outer layers that can be used are outer layers produced continuously or batchwise and based on melamine-phenol resins, on phenol-formaldehyde resins, on epoxy resins, or on unsaturated polyester resins.

The polyurethane sandwich components produced in an inventive process can by way of example be used as structural components or cladding components, in particular in the automobile industry, in the furniture industry, or in the construction industry.

During pressing, the "unfinished sandwich" components are, if appropriate, trimmed by way of "flash faces" or "pinch edges", thus eliminating any need for further mechanical operations downstream, for example stamping or milling.

A feature of the inventive polyurethane sandwich components is improved edges in comparison with components produced without use of inventive reactive chain extenders (c). There is also less penetration of the polyurethane reaction mixture into the core layer during an inventive process for the production of polyurethane sandwich components, thus achieving a saving in materials and lower weight of the sandwich components.

A feature of the inventive process for production of polyurethane sandwich components is reduced soiling of plant, since the inventive "unfinished sandwich" components have less tendency toward dripping. Furthermore, the cost of downstream control during production decreases greatly, since the inventive process is substantially easier to control than, for example, the gas-loading process.

The examples below are intended to illustrate the invention.

INVENTIVE EXAMPLE

Polyol 1: Polyether polyol whose OH number is 555, prepared via addition of PO to glycerol.
Polyol 2: Polyether polyol whose OH number is 935, prepared via addition of EO to trimethylolpropane.
Polyol 3: Polyether polyol whose OH number is 400, prepared via addition of EO/PO to sucrose/diethylene glycol mixture.
Stabilizer: Tegostab® B8443 silicone stabilizer, GE Bayer Silicones
Catalyst 1: aminic gel catalyst
Catalyst 2: Ethacure® 100, Albermarle
Dye: Isopur® SU-12021/9111, ISL-Chemie
Polyisocyanate: Lupranat® M20W, BASF AG

| Formulation 1: (inventive) | | |
|---|---|---|
| Polyol component | | |
| Polyol 1 | 34.00 | Parts by weight |
| Polyol 2 | 25.00 | Parts by weight |
| Polyol 3 | 34.00 | Parts by weight |
| Stabilizer | 0.40 | Parts by weight |
| Water | 0.40 | Parts by weight |
| Catalyst 1 | 0.20 | Parts by weight |
| Catalyst 2 | 2.00 | Parts by weight |
| Dye | 4.00 | Parts by weight |
| Isocyanate component | | |
| Polyisocyanate | 200.00 | Parts by weight |

The average OH number of the polyol mixture (polyols 1 to 3) is 600 mg KOH/g

| Formulation 2: (comparison) | | |
|---|---|---|
| Polyol component | | |
| Polyol 1 | 35.80 | Parts by weight |
| Polyol 2 | 25.00 | Parts by weight |
| Polyol 3 | 34.00 | Parts by weight |
| Stabilizer | 0.40 | Parts by weight |
| Water | 0.40 | Parts by weight |
| Catalyst 1 | 0.40 | Parts by weight |
| Catalyst 2 | | |
| Dye | 4.00 | Parts by weight |
| Isocyanate component | | |
| Polyisocyanate | 200.00 | Parts by weight |

The average OH number of the polyol mixture (polyols 1 to 3) is 598 mg KOH/g

Example 1

Inventive

An inventive polyol component was formulated with addition of the chemical thixotropic effect. This was mixed with isocyanate by means of a high-pressure spray system and spray-applied to a "sandwich precursor" provided. Both sides of an expandable honeycomb paperboard of thickness 17 mm were covered with 225 g/m² of random glass mat and sprayed with about 225 g/m² of PU reaction mixture. This semifinished product was then placed over a carton for 30 seconds and the amount of the component dripping from the sprayed semifinished product was observed. Hardly any dripping was observed. No significant run of the reaction mixture applied occurs on the semifinished product.

In a further test, an inventive semifinished product was pressed in a mold heated to 130° C. to a component thickness of 15.5 mm and demolded after 60 s. Very good edges were observed here, particularly in regions with sharp edges.

Example 2

Comparison

The test described in example 1 was repeated, but the formulation without chemical thixotropic effect was used. The spray-applied component exhibits severe dripping. Severe run on the semifinished product also occurs.

Marked defects at the edges are observed during pressing of an semifinished product according to example 2.

The invention claimed is:

1. A process for producing a polyurethane sandwich component, the method comprising:
   i. applying a polyurethane reaction mixture to a reinforcing fiber layer upon a core layer, to obtain a first component;
   ii. placing the component from i. into a mold, pressing the first component in the mold, compressing and shaping the first component in the mold and hardening the polyurethane reaction mixture in the mold, to obtain a molding;
   iii. removing the molding from the mold; and,
   iv. optionally, subjecting the molding to a downstream operation,
   wherein the polyurethane reaction mixture in the applying i. comprises
   (a) a polyisocyanate,
   (b) a compound reactive with an isocyanate,
   (c) a reactive chain extender comprising at least two groups reactive toward an isocyanate, wherein at least one of the groups reactive toward isocyanates is a free, primary $NH_2$ group,
   (d) a catalyst, and
   (e) optionally, a further additive.

2. The process claim 1, wherein the reactive chain extender (c) is a diamine.

3. The process of claim 1, wherein the reactive chain extender (c) is an aromatic diamine.

4. The process of claim 1, wherein the reactive chain extender (c) is tolylenediamine or a derivative of tolylenediamine.

5. The process of claim 4, wherein the derivative of tolylenediamine comprises 3,5-diethyltolylene-2,4-diamine.

6. The process of claim 4, wherein the derivative of tolylenediamine is a diethyltoluenediamine.

7. The process of claim 1, wherein the reactive chain extender (c) comprises, between the at least two groups reactive toward isocyanates, at least two alkylene groups each bearing one or two carbon atoms, wherein each of the alkylene groups are separated by a heteroatom.

8. The process of claim 7, wherein the heteroatom is at least one of nitrogen and oxygen.

9. The process of claim 1, wherein the core layer is a honeycomb paperboard.

10. The process of claim 1, wherein the reinforcing layer is a glass fiber mat.

11. The process of claim 1, wherein the reactive chain extender (c) comprises tolylenediamine.

12. The process of claim 1, wherein a molar mass of the reactive chain extender (c) is from 100 to 400 g/mol.

13. The process of claim 1, wherein a molar mass of the reactive chain extender (c) is from 100 to 200 g/mol.

14. The process of claim 1, wherein a molar mass of the reactive chain extender (c) is from 100 to 150 g/mol.

15. The process of claim 1, wherein a molar mass of the reactive chain extender (c) comprises triethylene glycol diamine.

16. The process of claim 1, wherein a proportion of the reactive chain extender (c) in the polyol component is from 0.1 to 10% by weight, based on the total weight of components (b) to (e).

17. The process of claim 16, wherein the proportion is from 0.3 to 8% by weight.

18. The process of claim 1, wherein the pressing in ii. comprises trimming away excess sandwich by at least one of a flash face and a pinch edge, and no downstream operation is carried out.

19. The process of claim 1, wherein the applying i. is by spraying.

20. The process of claim 1, wherein the compound reactive with the isocyanate (b) comprises a polyether polyol with an average functionality of from 1.5 to 5.0, and a number-average molecular weight of from 32 to 1500.

* * * * *